Dec. 10, 1957 C. PAULY 2,815,708
PLIOFILM-LINED CHEESE BOX (CHEESE MOLD)
Filed Sept. 20, 1954
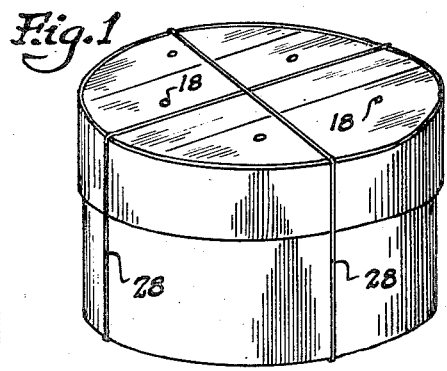
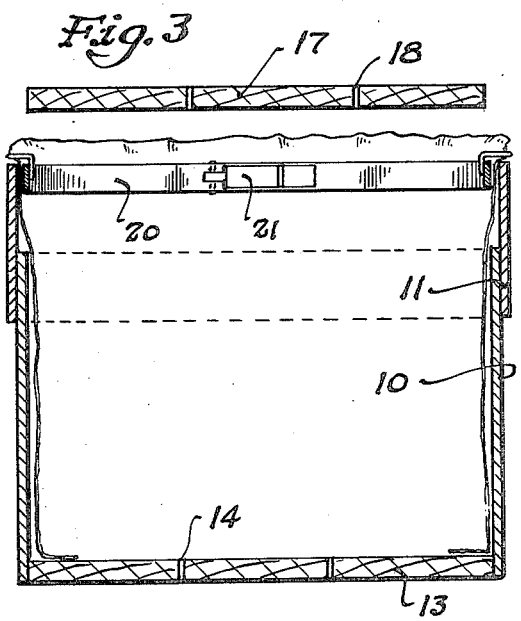
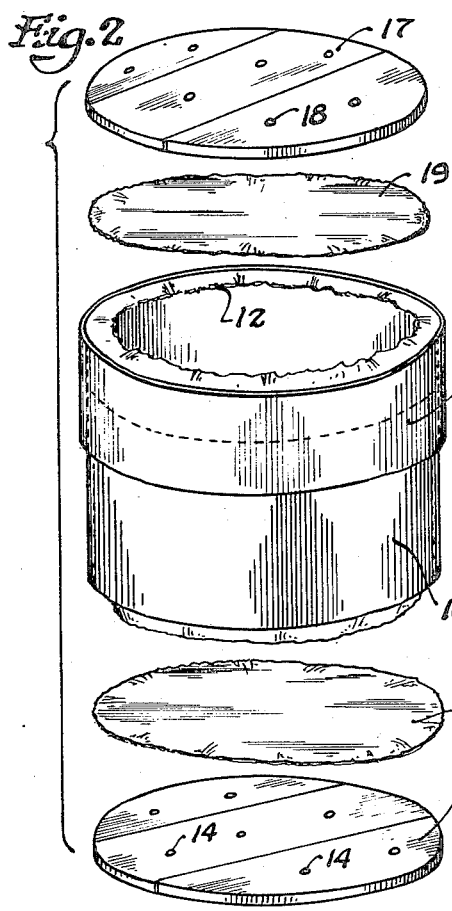
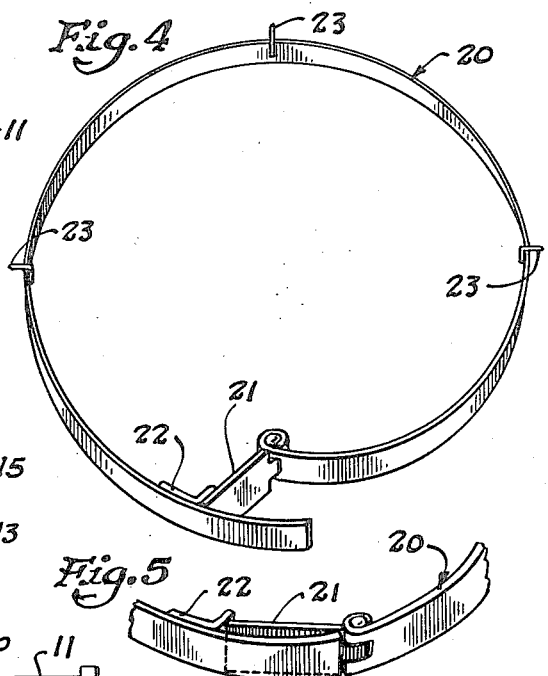
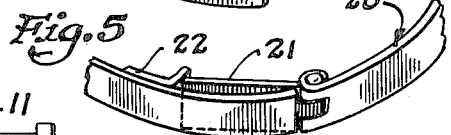
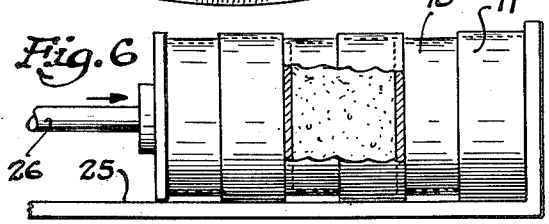
INVENTOR.
Charles Pauly
BY
R. L. Story
ATTORNEY

2,815,708
PLIOFILM-LINED CHEESE BOX (CHEESE MOLD)

Charles Pauly, Port Washington, Wis., assignor to Swift & Company, Chicago, Ill., a corporation of Illinois Application September 20, 1954, Serial No. 457,070

2 Claims. (Cl. 100—248)

The present invention relates to an article of manufacture which may serve as a cheese hoop and a storing or shipping container for the pressed cheese curd.

The present invention is a continuation in part of my prior application, Serial No. 232,040, now Patent No. 2,760,430, the disclosure of which is incorporated herein by reference.

The principal object of the present invention is to provide a disposable shipping container and cheese hoop which will telescope to permit a number of filled containers to be placed simultaneously in a cheese press and the curd pressed therein.

A further object is to eliminate the necessity for using special followers or spacer blocks between such containers to permit pressure to be continuously exerted on the curd in the press even though the space occupied by the curd in the container decreases due to the force exerted on the curd.

Other objects and advantages will be apparent from the following description taken in conjunction with the drawings in which:

Fig. 1 is a perspective view of a cheese container produced in accordance with the present invention;

Fig. 2 is an exploded view of the container of Fig. 1;

Fig. 3 is a sectional elevation of the container preparatory to filling with curd;

Fig. 4 is a perspective view of the liner retaining band;

Fig. 5 is a partial view of the band of Fig. 4 illustrating the extended position thereof; and Fig. 6 is a diagrammatic illustration of a cheese press with the curd being pressed in containers of the present invention.

As will be seen from the drawings, the subject matter of this invention comprises a main cylindrical shell 10 and a second cylindrical shell 11. The inner diameter of the second shell 11 is substantially equal to the outer diameter of the main shell 10 so that the second shell 11 forms a sliding fit over the outside of the main shell. The height of the second shell 11 with respect to the height of the main shell 10 is not critical and may be varied to a certain extent depending upon the conditions under which the invention is used as, for example, the type of curd that is produced. Preferably the second shell 11 is about one-half as high as the main shell 10.

A fluid impervious plastic liner 12 surrounds the inner wall of the two shells. Preferably this plastic liner is a sheet of rubber hydrochloride such as that sold under the trademark "Pliofilm."

The bottom is closed with a perforate wood follower 13 having a plurality of holes 14 to permit the drainage of liquid therethrough. The diameter of follower 13 is just slightly smaller than the inner diameter of main shell 10 so that the follower will fit into the shell as shown in Fig. 3. A bottom liner 15, preferably of the same material used for shell liner 12 is provided for bottom 13.

A top 17 having a plurality of holes 18 fits within the second shell 11. An upper liner 19 corresponding to bottom liner 15 is also provided to hold the side liner 12 in place during the filling of the cylinders with curd.

I have devised an expansible metal ring generally 20 to hold liner 12 in place during the filling of the hoop. Ring 20 is split and at one end thereof is pivotally attached a latch 21. Adjacent the other end of the ring 20 is an abutment 22. Intermediate the ends of the ring are a plurality of hooks 23 to support the ring 20 from the sides of shell 11.

The use of the device is as follows: The two shells 10 and 11 are fitted together, with the smaller shell 11 overlapping the larger shell 10 to only a limited extent. The side liner 12 is inserted and supported in place by ring 20. This is accomplished by fitting the ring while in collapsed condition as shown in Fig. 4 into the liner 12 as shown in Fig. 3, with the hooks 23 overhanging the walls of shell 11. The end of latch 21 is brought into contact with abutment 22, and by pushing outwardly on the end of ring 20 to which the latch is attached, the latch forces the ring 20 to expand to clamp the liner 12 in place in the shell 11.

Bottom 13 is inserted into shell 10 without having liner 15 in place. The assembly is then filled with cheese curd. Ring 20 is removed and top follower 17 is inserted within shell 11.

A plurality of similar filled curd holders are placed in a cheese press illustrated diagrammatically at 25 in Fig. 6. Pressure is applied to the contents of the press through rod 26 in the conventional manner and this pressure is allowed to remain upon the curd for the usual period of time. During this period of time the curd compresses, and as it does so secondary shell 11 telescopes over main shell 10 to take up the reduction in size of the curd contents.

After the curd has been pressed to the desired extent, the shells are removed from the press 25. Bottom follower 13 and top follower 17 are removed sequentially, liners 15 and 19 are inserted under the respective followers, and the followers replaced. When top follower 17 is removed, it may be found desirable to smooth the top of the side liner 12 out over the central portion of the curd to take up the slack that developed due to the collapsing of the curd and the telescoping of the shells 10 and 11.

After the curd has been fully covered by the liners 12, 15, 19, and the followers 13 and 17 replaced, the assemblage is bound with a plurality of wire straps 28 as shown in Fig. 1. The assemblage now is ready for setting aside to be aged, or may be immediately shipped to a purchaser of the product.

The shells 10 and 11 may be of an inexpensive cardboard material while ends 13 and 17 are preferably of light wood. From this it will be seen that the cost of this device is relatively small and is little more than the usual cost expended for shipping containers for conventional cheese wheels. At the same time, this device replaces the cheese hoops, bandages and wax which are conventionally used in the industry with the substantial saving in investment expenditures attendant upon the acquisition of the conventional hoops and the maintenance of those hoops in suitable condition for use, plus the saving in the cost of bandages and wax.

The foregoing description of a specific embodiment is for the purpose of complying with 35 U. S. C. 112 and we wish it to be understood that we do not desire to be limited to the exact details of the construction shown and described for obvious modifications will occur to a person skilled in the art.

I claim:

1. A device for use as a combination cheese hoop and aging or shipping container for the cheese curd, said device comprising a first cylindrical fiber shell, a second cylindrical shell fitting closely about said shell and being substantially smaller in height than said first shell, a plastic liner for said two shells, a perforate wooden bottom of circular shape for said first shell, the diameter of said bottom being slightly smaller than the inner diameter of said first shell, a plastic liner for said bottom, a split metal ring to fit within said second shell, said ring having means to hold the ring in expanded condition against the inner wall of said second shell at the top thereof, a circular wooden follower having a diameter less than the inner diameter of said second shell, and a plastic liner for said follower.

2. A disposable device for use as a combination cheese hoop and aging or shipping container for the cheese curd, said device comprising a first cylindrical fiber shell, a second cylindrical fiber shell fitting closely about said shell and being substantially smaller in height than said first shell, a plastic liner for said two shells, a perforate wooden bottom of circular shape for said first shell, the diameter of said bottom being slightly smaller than the inner diameter of said first shell, a plastic liner for said bottom, a split metal ring to fit within said second shell, said ring having a latch and an abutment at the ends thereof to hold the ring in expanded condition against the walls of the second shell, said ring having a plurality of projecting hooks to support the ring at the top of said second shell, a circular wooden follower having a diameter less than the inner diameter of said second shell, and a plastic liner for said follower.

References Cited in the file of this patent

UNITED STATES PATENTS

| | | |
|---|---|---|
| 85,201 | Bent | Dec. 22, 1868 |
| 214,381 | Freeman | Apr. 15, 1879 |
| 471,756 | Hadcock | Mar. 29, 1892 |
| 1,061,929 | Simon | May 13, 1913 |
| 2,424,693 | Jones | July 29, 1947 |
| 2,760,430 | Pauly | Aug. 28, 1956 |

FOREIGN PATENTS

| | | |
|---|---|---|
| 576,896 | Great Britain | Apr. 25, 1946 |